US 11,391,906 B2

(12) United States Patent
Hudman (10) Patent No.: US 11,391,906 B2
(45) Date of Patent: Jul. 19, 2022

(54) OPTICAL SYSTEM FOR HEAD-MOUNTED DISPLAY DEVICE

(71) Applicant: Valve Corporation, Bellevue, WA (US)

(72) Inventor: Joshua Mark Hudman, Issaquah, WA (US)

(73) Assignee: Valve Corporation, Bellevue, WA (US)

(*) Notice: Subject to any disclaimer, the term of this patent is extended or adjusted under 35 U.S.C. 154(b) by 201 days.

(21) Appl. No.: 16/676,205

(22) Filed: Nov. 6, 2019

(65) Prior Publication Data

US 2021/0132323 A1 May 6, 2021

(51) Int. Cl.
*G02B 7/02* (2021.01)
*G02C 7/02* (2006.01)
*G06F 1/16* (2006.01)

(52) U.S. Cl.
CPC ............ *G02B 7/023* (2013.01); *G02B 7/021* (2013.01); *G02C 7/02* (2013.01); *G06F 1/163* (2013.01)

(58) Field of Classification Search
CPC ...... G02B 7/023; G02B 7/021; G02B 3/0081; G02B 27/0172; G02B 27/01; G02B 27/017; G02C 7/02; G02C 7/081; G02C 7/086; G06F 1/163
See application file for complete search history.

(56) References Cited

U.S. PATENT DOCUMENTS

| 2017/0090514 A1* | 3/2017 | Byun ................. G02B 27/0176 |
| 2019/0041644 A1* | 2/2019 | Abele .................... G06K 9/344 |
| 2019/0171023 A1* | 6/2019 | Carlvik ............. G02B 27/0172 |
| 2020/0051320 A1* | 2/2020 | Laffont .................. G06F 3/013 |
| 2020/0174284 A1* | 6/2020 | Chan .................... G02B 6/4204 |

* cited by examiner

*Primary Examiner* — Darryl J Collins
*Assistant Examiner* — Matthew Y Lee
(74) *Attorney, Agent, or Firm* — Seed Intellectual Property Law Group LLP (57) ABSTRACT

Systems and methods for providing an optical system in a head-mounted display (HMD) that is operable to modify virtual image light to correct for one or more vision conditions of a user's eyes. The optical system includes a left optical subsystem for the left eye and a right optical system for the right eye. Each optical subsystem includes a first correction portion and a second correction portion each having a lens assembly. A first lens assembly includes a first set of lenses having a first lens selectively adjustable along a first axis transverse to an optical path of the virtual image light. A second lens assembly includes a second set of lenses having a second lens selectively rotatable around a second axis transverse to the first axis. Selective adjustment of the first lens and the second lens helps to correct for the vision conditions in the user's eyes.

22 Claims, 7 Drawing Sheets

OPTICAL SYSTEM FOR HEAD-MOUNTED DISPLAY DEVICE

BACKGROUND

Technical Field

The present disclosure relates to optical systems for head-mounted display devices.

Description of the Related Art

Head-mounted display devices (HMDs) are display devices, worn on the head of a user, having one or more display units for presenting visual content to a user. HMDs are becoming increasingly popular to provide virtual reality (VR) or augmented reality (AR) experiences, or to facilitate gaming or presentation of audiovisual media. The display units are typically miniaturized and may include CRT, LCD, Liquid crystal on silicon (LCos), or OLED technologies, for example. Some HMDs are binocular and have the potential to display a different image to each eye. This capability is used to display stereoscopic images to present a more immersive user experience.

Existing HMDs do not account for a user's vision defects or deficiencies. For instance, persons with astigmatism, myopia, or hyperopia (also known as Presbyopia) may wear glasses to correct one or more of these conditions. However, previously-implemented HMDs display visual content to users without adapting virtual image light to correct for these conditions. At least some HMDs do not have sufficient space in front of or around a user's eyes to allow the user to wear vision correction glasses and the HMD. As a result, the visual content may appear unfocused or unclear to a user afflicted with defects or deficiencies in vision who wear glasses, detracting from the user's overall experience.

BRIEF SUMMARY

A head-mounted display may be summarized as including a virtual image display unit and an optical system for modifying virtual image light received to correct for one or more vision conditions of a user. The optical system includes a left optical subsystem and a right optical subsystem that are respectively operable to modify virtual image light received from the virtual image display to correct for vision conditions of a left eye and a right eye. Each of the left optical subsystem and the right optical subsystem include a first correction portion and a second correction portion. The first correction portion and the second correction portion are independently and selectively adjustable to correct for one or more vision conditions. The first correction portion is selectively adjustable to correct for a first set of vision conditions and the second correction portion is selectively adjustable to correct for a second set of vision conditions.

The optical system is operable to modify the virtual image light to correct for myopia, hyperopia, and astigmatism in the user's eyes. One of the first correction portion and the second correction portion includes a first set of lenses that are sequentially arranged along an optical path of the virtual image light. Actuators are respectively physically coupled to individual lenses of the first set of lenses and configured to move the individual lens along a first axis transverse to the optical path. The first set of lenses are selectively adjustable by one or more actuators to correct the first set of vision conditions, including myopia and hyperopia. The other of the first correction portion and the second correction portion includes a second set of lenses that are sequentially arranged along the optical path of the virtual image light. Actuators are respectively physically coupled to the individual lenses of the second set of lenses and configured to rotate the individual lenses about a second axis transverse to the first axis. The second set of lenses are selectively adjustable by one or more actuators to correct the second set of vision conditions, including astigmatism.

In some embodiments, the optical system is an integral, non-removable part of the HMD. In some embodiments, the optical system is selectively installable in and removable from a main body of the HMD. The HMD may include a cavity for selectively receiving the optical system. The HMD may receive user inputs via input devices on the HMD itself or via a communication interface of the HMD. In some embodiments, a controller of the HMD or the optical system may send control signals to the actuators coupled to the first set of lenses and/or actuators coupled to the second set of lenses for causing the actuators to move or rotate the lenses into desired positions to correct for the user's vision conditions. In some embodiments, user input via mechanical input devices of the HMD may apply a mechanical force causing the actuators to move or rotate the lenses.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising"

is synonymous with "including," and is inclusive or open-ended (i.e., does not exclude additional, unrecited elements or method acts). References to the term "set" (e.g., "a set of items"), as used herein, unless otherwise noted or contradicted by context, is to be construed as a nonempty collection comprising one or more members or instances.

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
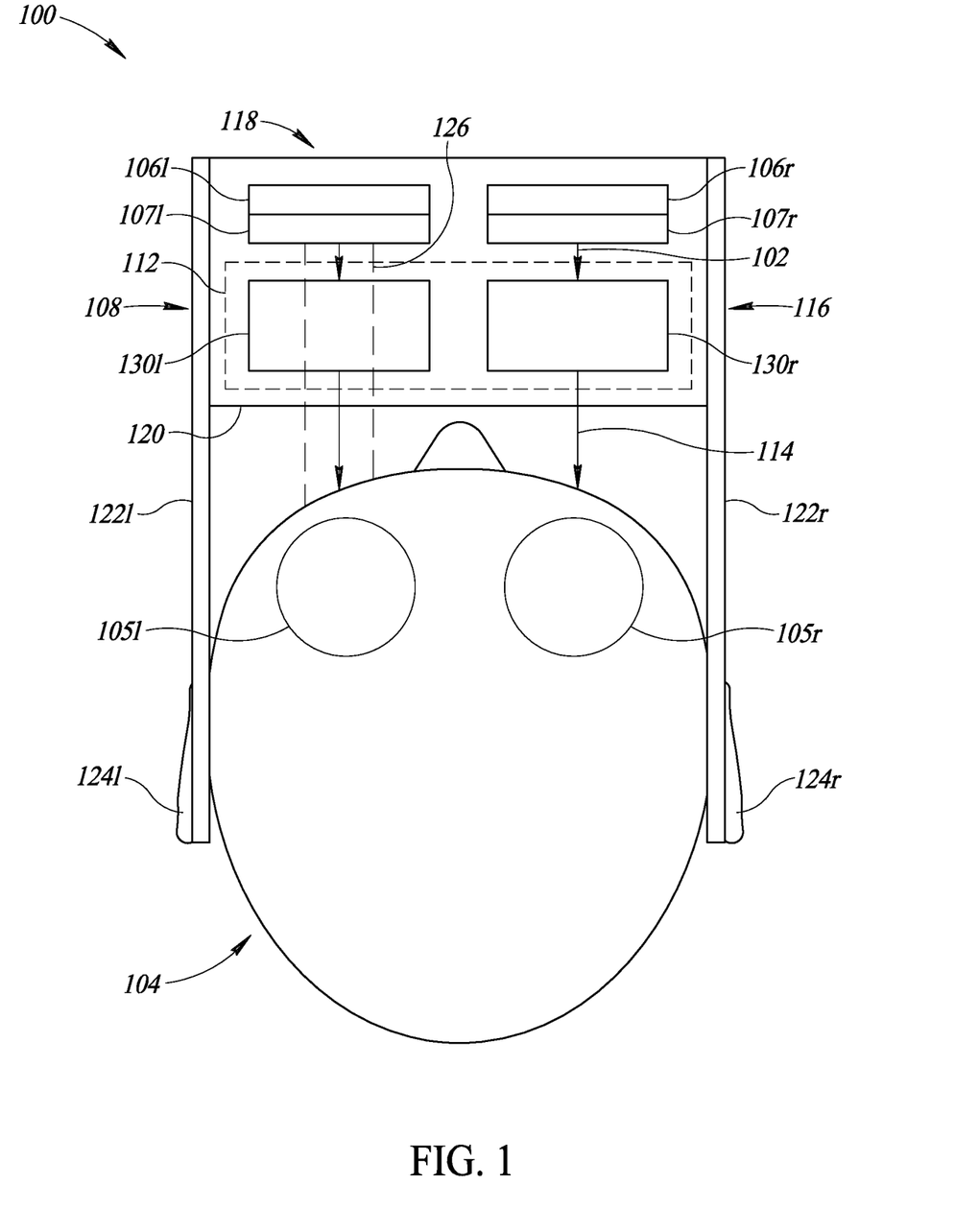
FIG. 1 shows an overhead plan view of a head-mounted display having an optical system according to one or more implementations.

FIG. 1 shows an overhead plan view of a head-mounted display device (HMD) 100 according to one or more embodiments. The HMD 100 is configured to present a virtual reality (VR) to a user 104, such as via corresponding video presented at a display rate such as 30 frames (or images) per second or 90 frames per second, while other embodiments of a similar system may present an augmented reality display to the user 104. The HMD 100 provides corrected virtual image light 102 to a left eye 105l and a right eye 105r of a user 104. The HMD 100 includes one or more virtual image display units 106 mounted to or within a frame 108. The virtual image display units 106 generate virtual image light 102 for causing the user to perceive visual content. The HMD 100 may further include left and right sets of lenses 107l and 107r provided on an emission side of the virtual image display units 106. The left and right sets of lenses 107l and 107r may focus, collimate, or otherwise modify the virtual image light 102 after it is emitted from the virtual image display units 106. The left and right sets of lenses 107l and 107r may include, for example, Fresnel lenses that refract or collimate the virtual image light 102.

The HMD 100 also includes an optical system 112 that has optical characteristics that are selectively variable for correcting for one or more vision conditions of the user. For instance, the optical system 112 is selectively adjustable to correct for one or more of myopia, hyperopia, and astigmatism. The virtual image light 102 emitted from the virtual image display units 106 travels along an optical path 126 through the optical system 112, which modifies the virtual image light 102 according to the optical characteristics of the optical system 112 and emits corrected virtual image light 114 to the left and right eyes 105l and 105r, respectively, of the user.

The frame 108 is a mounting structure for supporting the HMD 100 on the head of the user 104. The frame 108 includes a main body 116 having a front portion 118 and a viewing portion 120 opposite to the front portion 118 for positioning in front of the user's eyes 105l and 105r to view the visual content generated. The HMD 100 includes one or more support structures for selectively mounting the HMD 100 to the user's head. For instance, the HMD 100 of FIG. 1 includes left and right temples 122l and 122r for respectively resting over the left and right ears 124l and 124r of the user 104. In some embodiments, the HMD 100 may include another support structure, such as a strap connected to the main body 116 that wraps around the back of the head of the user 104. A nose assembly (not shown) of the HMD 100 may support the main body 116 on the nose of the user 104. The frame 108 may be shaped and sized to position the optical system 112 in front of one of the user's eyes 105l and 105r. Although the frame 108 is shown in a simplified manner similar to eyeglasses for explanatory purposes, it should be appreciated that in practice more sophisticated structures (e.g., goggles, integrated headband, helmet, straps, etc.) may be used to support and position the HMD 100 on the head of the user 104.

The virtual image display units 106 generate the virtual image light 102 that is transmitted through and selectively modified by the optical system 112. The virtual image display units 106 include a left display unit 106l for generating image light for presentation to the left eye 105l and a right display unit 106r for generating image light for presentation to the right eye 105r. The virtual image display units 106 may include liquid crystal displays (LCDs), light emitting diodes (LEDs), cathode ray tubes (CRTs), liquid crystal on silicon (LCos), or other light emitting technologies that generate the virtual image light 102. The virtual image display units 106 of the embodiment shown in FIG. 1 are located in a front portion of the HMD 100 and emit light in a rearward direction toward the eyes of the user 104. In some embodiments, the virtual image display units 106 may include waveguides that direct (e.g., reflect, refract) the virtual image light 102 toward the eyes 105l or 105r such that the light emitting elements of the virtual image display units 106 are not required to be directly in front of the eyes 105l and 105r for the user 104 to perceive the visual content. In some embodiments, the front portion 118 of the main body 116 may be at least partially transparent such that the user 104 may perceive external content for providing an augmented reality experience. While not illustrated here, some embodiments of the HMD 100 may include various additional internal and/or external sensors, such as to perform pupil tracking separately for each eye 105l and 105r, to track head location and orientation (e.g., as part of head tracking), to track various other types of movements and position of the user's body, cameras to record external images (e.g., of an environment), etc.

While the described techniques may be used in some embodiments with a display system similar to that illustrated in FIG. 1, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens. In other embodiments, the user may view one or more images through one or more optical lens that are produced in manners other than via a display panel, such as on a surface that reflects light from another light source in part or in whole.

The virtual image light 102 may comprise a plurality of light rays that travel from each of the virtual image display units 106 along an optical path 126 through the optical system 112 and toward the viewing portion 120. The optical system 112 modifies some or all of the plurality of light rays to provide the corrected virtual image light 114. The optical system 112 includes a plurality of optical subsystems 130 including a left optical subsystem 130l for modifying the virtual image light 102 for the left eye 105l and a right optical subsystem 130r for modifying the virtual image light 102 for the right eye 105r. Each of the left and right optical subsystems 130l and 130r may be independently adjustable to correct for visual deficiencies or defects in the left eye 105l and the right eye 105r, respectively.

Figure 2:
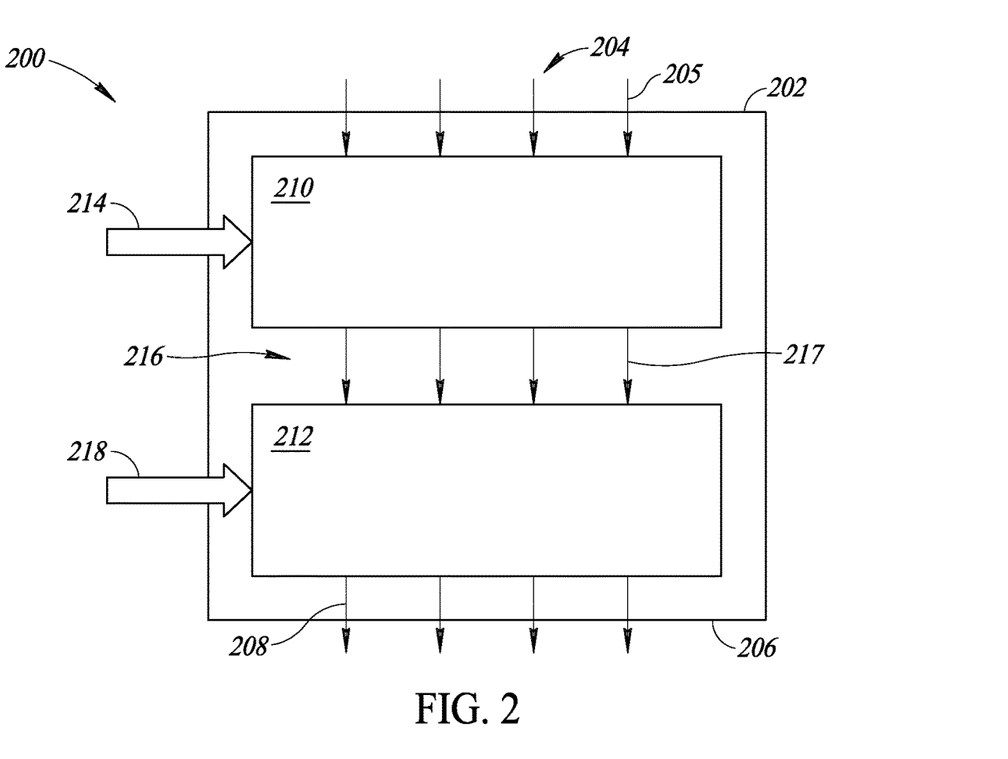
FIG. 2 shows a diagram of an optical subsystem of the optical system of the head-mounted display of FIG. 1.

FIG. 2 shows a diagram 200 of the optical subsystem 130 (e.g., optical subsystem 130l or 130r) of FIG. 1 according to one or more embodiments. The optical subsystem 130 includes a receiving portion 202 for receiving initial virtual image light 204 corresponding to the virtual image light 102 for a single eye, and an emitting portion 206 for emitting the corrected virtual image light 114. The optical subsystem 130 further comprises a first correction portion 210 located at a first location along optical path 126 (FIG. 1) of the plurality of light rays 204 and a second correction portion 212 located at a second location along the optical path 126 downstream from the first location. The first correction portion 210 and the second correction portion 212 each comprise a set of lenses and are operable to correct for deficiencies or defects in the vision of the user 104. The first correction portion 210 may correct for a different set of vision conditions than the second correction portion 212. For instance, one of the first correction portion 210 and the second correction portion 212 may correct for myopia or hyperopia whereas the other of the first correction portion 210 and the second correction portion 212 corrects for astigmatism. Optical characteristics of the first correction portion 210 and/or the second correction portion 212 may be adjusted as a result of receiving a stimulus, such as an electronic signal or an application of mechanical force, as described below in further detail. Although two correction portions 210 and 212 are described with respect to FIG. 2, the optical system 112 may include a single correction portion in some embodiments. For instance, the optical system 112 may include one of the first correction portion 210 and the second correction portion 212 for correcting myopia and/or hyperopia and the other of the first correction portion 210 and the second correction portion 212 may be omitted. As another example, the optical system 112 may include one of the first correction portion 210 and the second correction portion 212 for correcting astigmatism and omit the other of the first correction portion 210 and the second correction portion 212.

The first correction portion 210 is operable to apply first corrections to the initial virtual image light 204 to correct for the first set of vision conditions of the user 104. The initial virtual image light 204 may comprise a plurality of light rays 205 each having a particular set of attributes (e.g., color, direction, luminance) for causing the user 104 to perceive the visual content. In operation, the first correction portion 210 may receive a first stimulus 214 that causes first optical characteristics of the first correction portion 210 to change or modify the initial image light 204 as a correction for the first set of vision conditions. The first correction portion 210 may then emit intermediate virtual image light 216, which is received by the second correction portion 212. The intermediate virtual image light 216 comprises a plurality of light rays 217 at least some of which correspond to the plurality of light rays 205. In cases where the user does not have the first set of vision conditions, the intermediate virtual image light 216 may be substantially unmodified from the initial virtual image light 204. That is, the intermediate virtual image light 216 may have the same attributes as the initial virtual image light 204 received if the first correction portion 210 receives the first stimulus 214 that causes the first correction portion 210 to pass the initial virtual light without substantial modification since the user does not require correction for the first set of vision conditions.

The second correction portion 212 is operable to apply second corrections to the intermediate virtual image light 216 (or to the initial virtual image light 204 in implementations wherein the first correction portion 210 is not present) to correct for the second set of vision conditions of the user 104. The second correction portion 212 may receive a second stimulus 218 that causes second optical characteristics of the second correction portion 212 to change to modify the intermediate virtual image light 216 as a correction for the second set of vision conditions, which may be distinct from the first set of vision conditions. The second correction portion 212 may then emit the corrected virtual image light 208, which comprises a plurality of light rays at least some of which correspond to the light rays 216. As with the first correction portion 210, the corrected virtual image light 114 may be substantially unmodified from the intermediate virtual image light 216 if the user 104 is not afflicted with any of the second set of vision conditions. That is, the second correction portion 212 may not modify the intermediate virtual image light 216 if the second stimulus 218 causes the second correction portion not to correct for any one or more of the second set of vision conditions.

Figure 3:
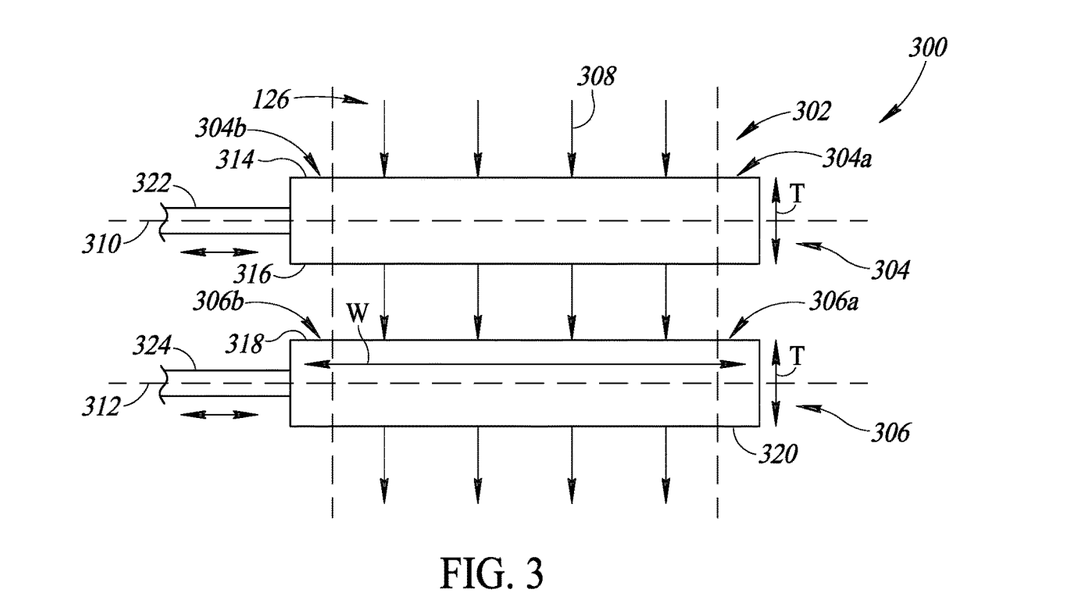
FIG. 3 shows an overhead plan view of a first set of lenses of the optical subsystem of FIG. 2.

FIG. 3 is a diagram 300 that shows an overhead plan view of a set of lenses 302 of a correction portion according to one or more embodiments. In particular, the set of lenses 302 are lenses of one of the first correction portion 210 and the second correction portion 212 of FIG. 2. The set of lenses 302 includes a first lens 304 and a second lens 306 that are successively arranged along the optical path 126 of the virtual image light 102. Each of the set of lenses 302 may have a width W longer than a thickness T. In some embodiments, the lenses 302 may have a substantially rectangular shape when viewed from a perspective along the optical path 126, for example. Rays 308 of the virtual image light 102 travelling along the optical path 126 are incident upon and travel through at least a portion of the first lens 304 and at least a portion of the second lens 306. At least one of the first lens 304 and the second lens 306 is selectively adjustable in directions transverse to the optical path 126 for modifying attributes of the rays 308. For instance, the set of lenses 302 may be adjustable to set an optical power or focus of the optical system 112 to correct for deficiencies or defects in the vision of the user 104. The first lens 304 may be selectively movable along an axis 310 that is transverse to the optical path 126 and the second lens is also selectively movable along an axis 312 that is transverse to the optical path 126 and spaced apart from the first axis 310 along the optical path 126. In some embodiments, a single one of the first lens 304 and the second lens 306 may be moveable relative to the other one of the first lens 304 and the second lens 306. In some embodiments, each of the first lens 304 and the second lens 306 is moveable relative to the other of the first lens 304 and the second lens 306.

The first lens 304 and the second lens 306 have respective widths W that extend along the first axis 310 and the second axis 312. The first lens 304 may have different characteristics at different portions along a width W of the first lens 304. A first portion 304a of the first lens 304 may have a different thickness and surface curvature than a thickness and/or curvature of a second portion 304b. The first portion 304a may, for instance, have a convex lens surface and have a first thickness in a thickness direction T whereas the second portion 304b may have a concave lens surface and a second thickness different than the first thickness. A first surface 314 of the first lens 304 may have a different shape than a second surface 316 of the first lens 304—for example, the first surface 314 may be flat along the width W whereas the second surface 316 may be curved (e.g., convex, concave, serpentine) along the width W. In some embodiments, the first lens 304 may have a surface that is curved along its entire length. In some embodiments, the first lens 304 may have a surface that is curved in one portion but flat in another portion. The flat portion may be used as a non-corrective portion that does not modify the virtual image light 102 to correct for vision conditions.

The second lens 306 may also have different characteristics at different portions along a width W of the second lens 306. A first portion 306a of the second lens 306 may have a different thickness and surface curvatures than a thickness and/or curvature of a second portion 306b. The first portion 306a may, for instance, have a concave lens surface and have a first thickness in a thickness direction T whereas the second portion 306b may have a convex lens surface and a second thickness different than the first thickness. The first portion 306a of the second lens 306 may have different characteristics than the first portion 304a of the first lens 304. A first surface 318 of the second lens 306 may have a different shape than a second surface 320 of the second lens 306—for instance, the first surface 320 may be curved along the width W whereas the second surface 322 may be flat along the width W. In some embodiments, the second lens 306 may have a surface that is curved along its entire length. In some embodiments, the second lens 306 may have a surface that is curved in one portion but flat in another portion. The flat portion may be used as a non-corrective portion that does not modify the virtual image light 102 to correct for vision conditions. In some embodiments, the first lens 304 and the second lens 306 may be Alvarez lenses or Lohmann lenses that have opposing complementary refractive surfaces (e.g., having a profile with a cubic function) and opposite-facing plano surfaces. For instance, opposite surfaces (surfaces facing away from each other) of the first lens 304 and the second lens 306 may have substantially plano surfaces whereas opposing surfaces (surfaces facing each other) of the first lens 304 and the second lens 306 may have complementary curved profiles that are the inverse of each other.

The first lens 304 and/or the second lens 306 may be selectively moved along the axis 310 and 312, respectively, to correct for a first set of vision conditions, which may include myopia and hyperopia. The set of lenses 302 may include a first actuator 322 that is physically coupled to the first lens 304 and that is configured to move the first lens 304 along the axis 310. The first actuator 322 may be moved as a result of the first stimulus 214 described above with respect to FIG. 2—for example, moved as result of a mechanical force applied to a dial, button, knob, etc., or as a result of the optical system 112 receiving an electronic signal for causing the first actuator 322 to move. The set of lenses 302 may also include a second actuator 324 that is physically coupled to the second lens 306 and that is configured to move the second lens 306 along the axis 312. The second actuator 324 may be moved as a result of a stimulus in a manner similar to the relationship of the first actuator 322 and the first stimulus 214. The first actuator 322 and the second actuator 324 may be moved independently of each other. Accordingly, the first actuator 322 may move the first lens 304 relative to the second lens 306 and the second actuator 324 may move the second lens 306 relative to the first lens 304.

The first lens 304 and the second lens 306 may be moved relative to one another to provide optical characteristics correcting for vision conditions. In some embodiments, one of the first lens 304 and the second lens 306 may be fixed whereas the other of the first lens 304 and the second lens 306 is adjustable relative to the fixed lens.

The first lens 304 and the second lens 306 may be aligned along the optical path 126 of the virtual image light 102 to correct one or more of the first set of vision conditions. For instance, the first portion 304a of the first lens 304 may be aligned with the first portion 306a of the second lens 306 to correct for myopia. As another example, the second portion 304b of the first lens 304 may be aligned with the second portion 306b of the second lens 306 to correct for hyperopia. In some embodiments, other portions of the first lens 304 and the second lens 306 may be aligned to transition the set of lenses 302 into a non-corrective state. Portions of the first lens 304 and the second lens 306 may be aligned along the optical path 126 to satisfy an optical prescription of the user 104 in some instances. For instance, the first lens 304 and the second lens may be positioned relative to each other to adjust the optical power (i.e., diopter) of the set of lenses 302. In some embodiments, the set of lenses 302 may provide corrections corresponding to a "spherical" or refractive portion of an optical prescription. Although only two lenses are depicted and described as comprising the set of lenses 302, the set of lenses 302 may include additional lenses without departing from the scope of the instant disclosure.

Figure 4A:
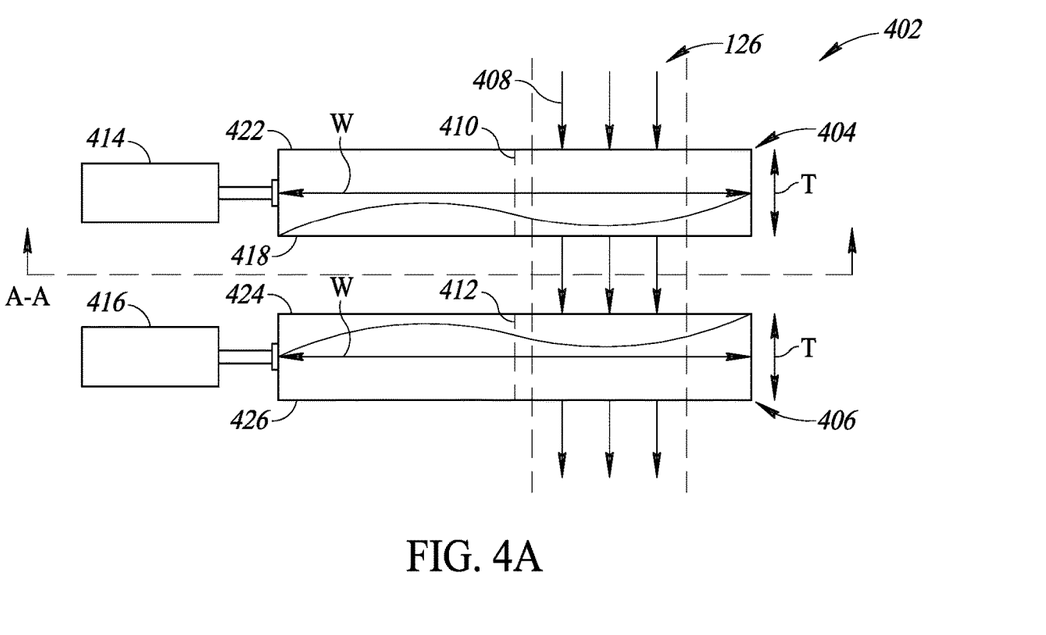
FIG. 4A shows an overhead plan view of a second set of lenses of the optical subsystem according to one embodiment.

FIG. 4A shows an arrangement 400 of a set of lenses 402 of a correction portion according to one or more embodiments. In particular, the set of lenses 402 are lenses of the other one of the first correction portion 210 and the second correction portion 212 than the set of lenses 302. The set of lenses 402 includes a first lens 404 and a second lens 406 that are successively arranged along the optical path 126 of the virtual image light 102 either before or after the set of lenses 302. The first lens 404 and the second lens 406 may have a substantially circular shape when viewed from a direction parallel to the optical path 126, for example. Rays 408 of the virtual image light 102 travelling along the optical path 126 are incident upon and travel through at least portions of the first lens 404 and the second lens 406.

The first lens 404 and the second lens 406 are selectively rotatable about axes parallel to the optical path 126. The first lens 404 is rotatable about a first axis 410 that is transverse to the axis 310 and the axis 312. The second lens 406 is also rotatable about a second axis 412 that is transverse to the axis 310 and the axis 312. In the current embodiment, the first axis 410 is coaxial with the second axis 412. In some embodiments, a single one of the first lens 404 and the second lens 406 may be rotatable relative to the other of the first lens 404 and the second lens 406. In such instances, the other one of the first lens 404 and the second lens 406 may be non-rotatable. In some embodiments, each of the first lens 404 and the second lens 406 is rotatable relative to each other.

A first actuator 414 is physically coupled to the first lens 404 and operable to selectively rotate the first lens 404 about the first axis 410. A second actuator 416 is physically coupled to the second lens 406 and operable to selectively rotate the second lens 406 about the second axis 412. As an example, the first and second actuators 414 and 416 may be respectively coupled to gears or teeth associated with the first lens 404 and the second lens 406 to cause the lenses to rotate in response to application of force by the actuator. The first and second actuators 414 and 416 respectively cause particular portions of the first and second lenses 404 and 406 to be positioned within the optical path 126 to modify attributes of the rays 408. For instance, the set of lenses 402 are selectively adjustable to correct for optical aberrations in the vision of the user 104, such as astigmatism. The set of lenses 402 may be adjustable to provide corrections for "cylinder" and "axis" portions of an optical prescription. In some implementations, however, the set of lenses 402 may be adjustable to provide correction for "spherical" or refractive portions of an optical prescription.

The first lens 404 and the second lens 406 may be Alvarez or Lohmann lenses (sometimes known as Alvarez-Lohmann lenses). In some embodiments, the Alvarez or Lohmann lenses have a circular shape when viewed from an optical surface thereof. In some embodiments, the Alvarez lenses have a rectangular shape when viewed from an optical surface thereof. The controller described herein operates the first and second actuators 414 and 416 to position portions of the first lens 404 and the second lens 406 in the optical path 126 to modify attributes of the rays 408, as described herein. For instance, in embodiments where one or both of the first lens 404 and the second lens 406 are Alvarez lenses, the relative positions of the first lens 404 and the second lens 406 may be adjusted to provide a profile (e.g., circular profile, cylindrical profile, elliptical profile) inducing phase variations in the rays 408 that correct for a vision condition of the user 104.

Figure 4B:
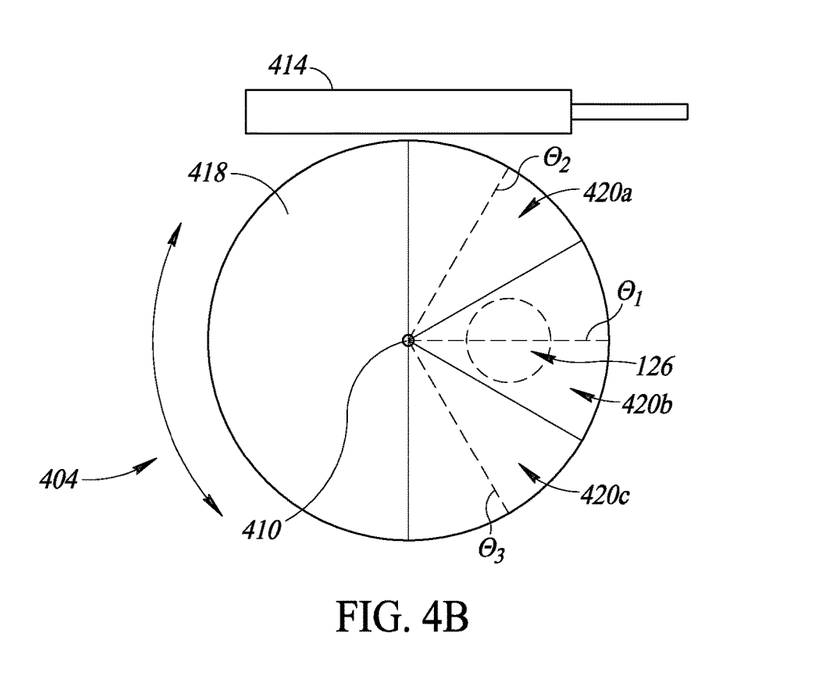
FIG. 4B shows a front plan view of a lens of the second set of lenses.

FIG. 4B shows a front plan view of the first lens 404 taken along the line A-A of FIG. 4A. The first lens 404 may have different characteristics at different angular positions or angular regions about the first axis 410. A second surface 418 of the first lens 404 may vary along a width W of the first lens 404 to form a curved surface providing different optical aberration correction at different angular positions about the axis 410. For instance, the second surface 418 may be non-symmetric along different angular positions about the axis 410. As shown in FIG. 4B, for instance, the first lens 404 may have a plurality of regions 420, each centered about a different angular position θ around the axis 410. Each region 420 may have different optical characteristics for applying different corrections for optical aberrations in an eye or vision of the user 104, such as for correcting astigmatism. For instance, a first region 420a is centered about an angular position $\theta_1$, a second region 420b is centered about an angular position $\theta_2$, and so forth, up to a number N regions. Each region 420 is shown in FIG. 4B as being exclusive to the other regions 420; however, this is merely for illustrative purposes and not intended to be limiting. The regions 420a, 420b, 420c, . . . 420N may overlap each other in at least some embodiments.

In FIG. 4B, the angular position of the first lens 404 is at $\theta_1$ such that the optical path 126 of the rays 408 of virtual image light is through the first region 420a. Accordingly, attributes of the rays 408 are modified, at least in part, according to the optical aberration correction characteristics of the first region 420a. The first actuator 414 may selectively rotate the first lens 404 such that the optical path 126 of the rays 408 is through a different region than the first region 420a to provide a different optical aberration correction. Each region 420 may cause the rays 408 of virtual image light 102 to refract at angles different than the rays 408 would refract at other regions 420. A first surface 422 of the first lens 404 opposite to the second surface 418 may have a different shape than the second surface 418—for instance, the first surface 422 may be flat or plano such that the rays 408 entering the first lens 404 are not refracted.

The second lens 406 may have a circular shape similar or identical to the first lens 404 a circular shape when viewed from a direction parallel to the optical path 126. The second lens 406 may have a first surface 424 that receives the rays 408 emitted from the first lens 404 and a second surface 426 that emits the rays 408. The first surface 424 may be similar or the same as the second surface 418 of the first lens 404. That is, the first surface 424 may vary along a width W of the second lens 406 to form a curved surface providing different optical aberration correction at different angular positions about the axis 412 to refract the rays 408 of virtual image light 102 in a manner similar to that described with respect to the first lens 404. In some embodiments, the first surface 424 of the second lens 406 may be complementary to the second surface 418 such that the first surfaces 418 and 424 may be places in contact with one another with no space existing therebetween. In some embodiments, the second surface 426 of the second lens 406 may have a flat or plano shape that does not refract the rays 408 of virtual image light 102 incident thereon. The second actuator 416 may selectively rotate the second lens 406 to cause the optical axis 126 to be aligned with a region of the first surface 424 corresponding to a particular angular position to correct for an optical aberration of the vision of the user 104, as described above with respect to the first lens 404.

The first actuator 414 and the second actuator 416 may respectively rotate first lens 404 and the second lens 406 in concert with each other to achieve a desired optical aberration correction for the vision of the user 104. An angular position θ of the first lens 404 and an angular position θ of the second lens 406 may be adjusted to provide an optical correction in the virtual image light 102 compensating astigmatism of the user's 104 vision. The optical correction may correspond to an optical prescription indicating spherical optical power, cylindrical optical power, and an axis of the user's 104 eye. The first lens 404 and the second lens 406 may be operated in concert to satisfy other indications of optical correction than correction for astigmatism. Further, angular positions θ of the first lens 404 and the second lens 406 may be adjusted such that the set of lenses 402 provide no optical correction for a vision condition, such as astigmatism.

In some embodiments, the set of lenses 402 may include more than two lenses. For instance, the set of lenses may include one or more additional lenses positioned between the first lens 404 and the second lens 406. The one or more additional lenses may each have one or both optical surfaces that have a curvature that varies along the width W of the lenses. As another example, pairs of lenses similar or identical to the first and second lenses 404 and 406 may be provided before or after the lenses 404 and 406 along the optical path 126. The additional lens or lenses may have actuators associated therewith for selectively rotating the lens to adjust a region of the lens through which the optical path extends.

Figure 5A:
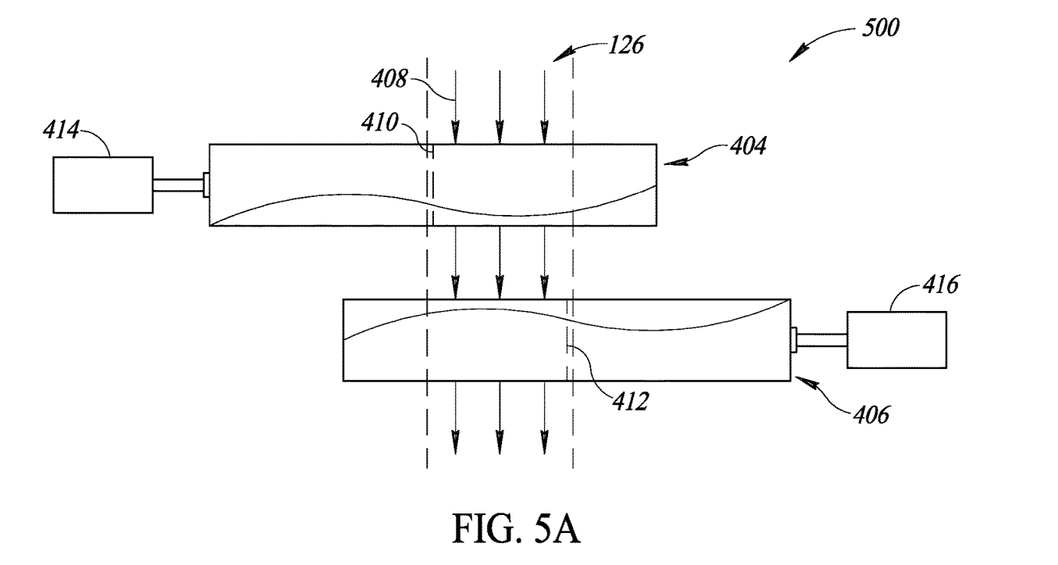
FIG. 5A shows an overhead plan view of the second set of lenses of the optical subsystem according to one embodiment.
Figure 5B:
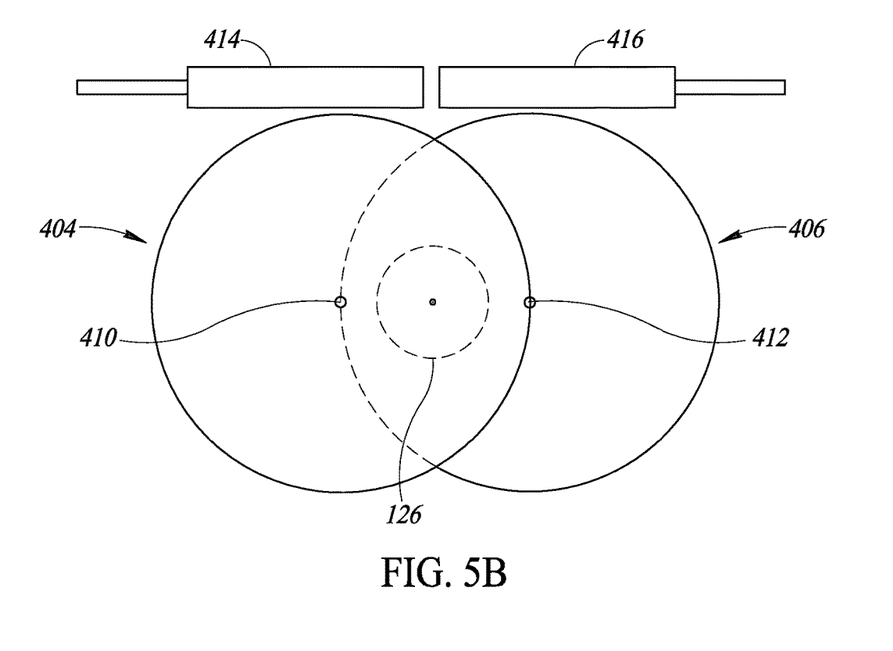
FIG. 5B shows a front plan view of the second set of lenses of FIG. 5A.

FIGS. 5A and 5B show an arrangement 500 of the first lens 404 and the second lens 406 according to one or more embodiments. The first lens 404 and the second lens 406 of the arrangement 500 have the same size and shape as the arrangement 400 with the exception that the axis 410 of the first lens 404 is not coaxial with the axis 412 of the second lens 406. In some embodiments, one or both of the first lens 404 and the second lens 406 may be moveable along axes transverse to the optical path 126 to adjust attributes of optical aberration correction.

Figure 6:
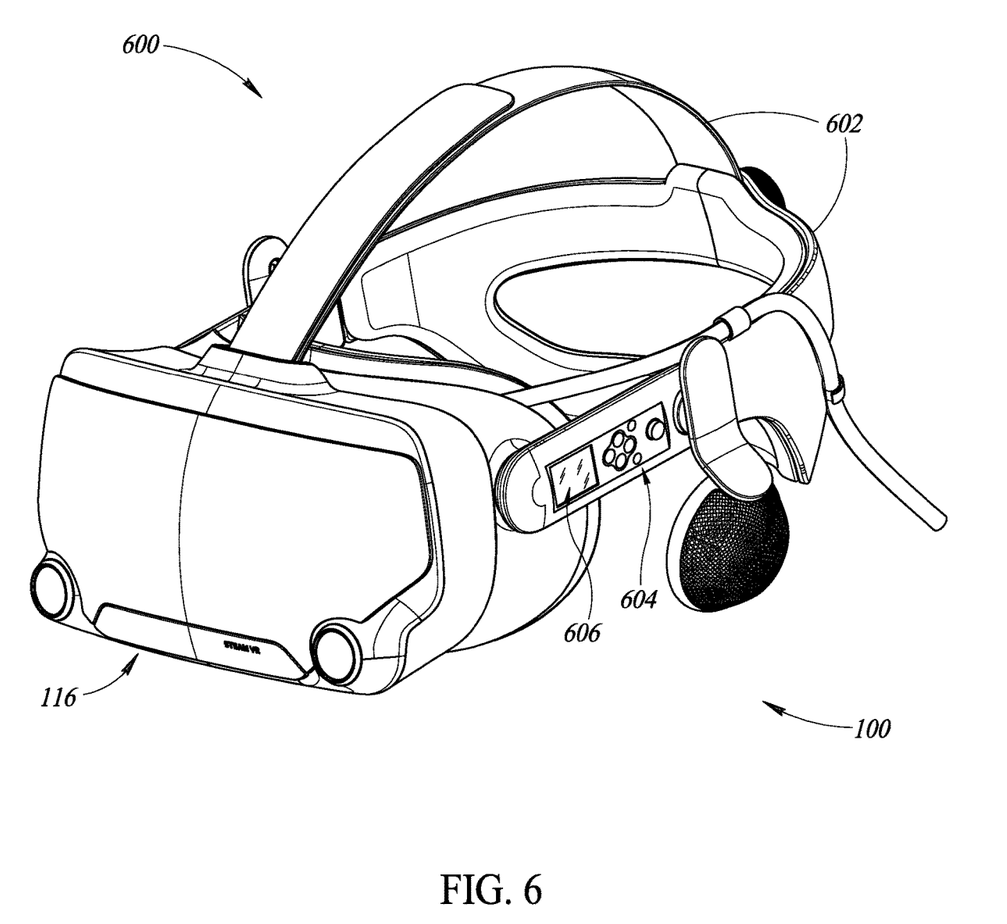
FIG. 6 shows an overhead perspective view of an exterior of the head-mounted display of FIG. 1.

FIG. 6 shows an exterior 600 of the HMD 100 according to one or more embodiments. The HMD 100 includes a set of straps 602 attached to the main body 116. The set of straps 602 are useable to selectively and securely mount the HMD 100 to the head of the user 104 for viewing visual content. The main body 116 may include a control panel 604 for controlling various aspects of the HMD 100. The control panel 604 may include one or more input devices for controlling optical characteristics of the optical system 112 to correct the visual content for vision conditions (e.g., myopia, hyperopia, astigmatism) of the user 104. The input devices may be coupled to the first and second actuators 322 and 324 to respectively control positions of the first lens 304 and the second lens 306 along the first axis 310 and the second axis 312. The input devices may be coupled to the first actuator 414 and the second actuator 416 to respectively control angular positions of the first lens 404 and the second lens 406 about the first axis 410 and the second axis 412.

The input devices may be mechanical devices that are mechanically coupled to and configured to control corresponding lenses. For instance, the input devices may be knobs or dials that are mechanically linked to actuators of corresponding lenses through, e.g., gears and shafts. Interaction with the mechanical input devices by the user 104 may cause a mechanical force to be applied to corresponding actuators to adjust the position of a lens. The input devices may be electrical devices that are electrically coupled to and configured to control corresponding lenses. As an example, the input devices may, in response to interaction by the user 104, cause an electrical signal to be sent to a controller that, in response, sends a control signal to corresponding actuators to adjust positions of the lenses. Non-limiting examples of an electrical input device of the control panel 604 include a keypad having a set of keys for providing alphanumeric input or navigating a menu, or a dial or knob that is electrically coupled to a controller that operates one or more actuators. The exterior 600 may include a display 606 for displaying information regarding the HMD 100, such as current optical settings of the optical system 112. In some embodiments, the display 606 may be a touchscreen input device that the user 104 may interact with to control the optical system 112.

In some embodiments, the user may adjust the optical settings of the optical system 112 in connection with visual content presented by the virtual image display unit(s) 106. For instance, the user wearing the HMD 100 may interact with the control panel 604 or other input device (e.g., hand-held controller, mouse, keyboard) according to a menu or other visual content displayed by the virtual image display unit(s) 106 to adjust the optical settings. As one example, the user may navigate a menu via the control panel 604 or other input device and provide user input that causes the optical settings of the optical system 112 to be changed in response. As another example, the HMD 100 may adjust the optical settings of the optical system 112 in real-time in response to user input regarding visual content perceived by the user 104. The user may initiate a visual test on the HMD 100 causing the virtual image display unit(s) 106 to display visual content, such as test patterns, and prompting the user to provide input regarding clarity of the visual content. As a result of receiving the input, the HMD 100 may automatically adjust the optical settings of the optical system 112 for improving the clarity of the visual content to improve the user's 104 experience.

Figure 7:
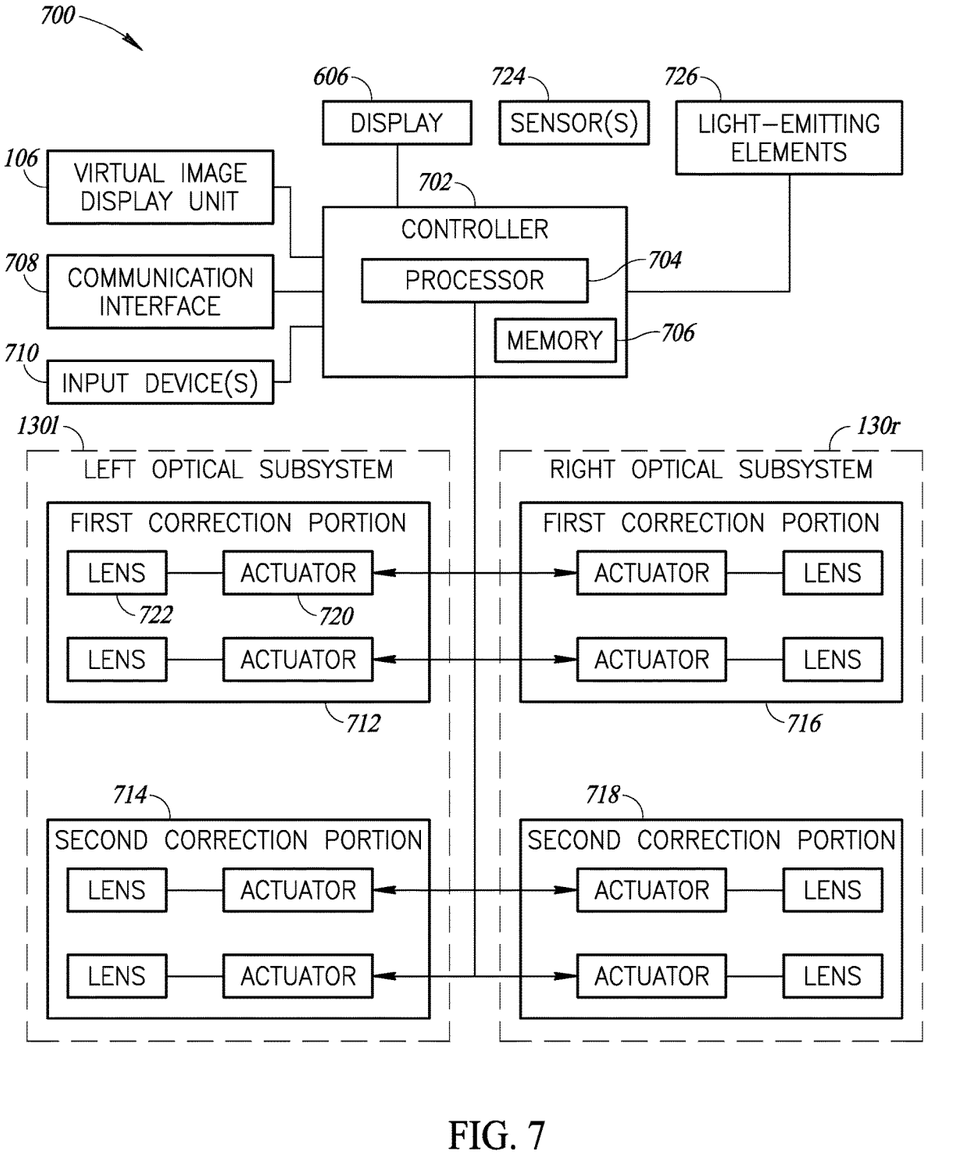
FIG. 7 shows a schematic block diagram of the head-mounted display.

FIG. 7 is a block diagram 700 showing interconnections of various parts of the HMD 100 according to one or more embodiments. The HMD 100 includes a controller 702 comprising one or more processors 704 and memory 706 storing a set of instructions that, as a result of execution by the one or more processors 704, cause the HMD 100 to perform one or more operations described herein. The memory 706 may include read-only memory (ROM) and random access memory (RAM) and may be in the form of solid-state memory or a hard disk drive, by way of non-limiting illustrative example. The HMD 100 also includes a communication interface 708 electrically coupled to the controller 702 for sending and receiving communications with external devices. The communication interface 708 may include one or more wireless transceivers, such as Wi-Fi transceivers, cellular transceivers, Bluetooth™ transceivers, etc., that wirelessly send and receive communications to and from external devices, such as a network router or a computing device (e.g., laptop, desktop, tablet, mobile device). The communication interface 708 may include a wired communication port, such as a universal serial bus port, a network interface port, or the like, for wired communication with external devices.

The HMD 100 may include a set of input devices 710 electrically coupled to the controller 702 for providing user input to the HMD 100. One or more of the set of input devices 710 may be provided on the exterior 600 of the HMD 100—for example, as part of the control panel 604. The controller 702 may also be electrically coupled to and configured to control the virtual image display units 106 and/or the display 606 if included. In some embodiments, the controller 702 may include one or more graphics processing units for generating the virtual image light 102 via the virtual image display units 106.

The controller 702 is electrically coupled to the optical system 112 and configured to control the optical system 112 for adjusting the optical characteristics thereof, as described herein. In particular, the controller 702 is electrically coupled to and configured to control a first correction portion 712 of the left optical subsystem 130l, a second correction portion 714 of the left optical subsystem 130l, a first correction portion 716 of the right optical subsystem 130r, and a second correction portion 718 of the right optical subsystem 130r. The first correction portions 712 and 716 include one of the set of lenses 302 and the set of lenses 402, and the second correction portions 714 and 718 include the other one of the set of lenses 302 and the set of lenses 402.

The controller 702 is electrically coupled to actuators 720 of the correction portions 712, 714, 716, and 718 to control the positions of the lenses 722 of the optical system 112. Specifically, the controller 702 sends signals (e.g., control signals) to the actuators 720 causing the actuators 720 to move or rotate the lens 722 coupled thereto. As described above, the positions (e.g., lateral offsets, angular positions θ) of the lenses 722 may be controlled to modify optical characteristics of the first correction portions 712 and 716 and/or the second correction portions 714 and 718. The controller 702 may send signals to control the optical subsystem 112 in response to receiving input. For instance, the controller 702 may adjust the optical characteristics of the optical system 112 in response to receiving input provided via the input device(s) 710. As another example, the controller 702 may adjust the optical characteristics of the optical system 112 in response to receiving an input via the communication interface 708.

The input received by the controller 702 may have a particular format. The input may indicate a prescription for the right eye and/or a prescription for the left eye. For each respective eye, the input may indicate a refractive or spherical power (sometimes denoted as SPH or S), a cylinder power (sometimes denoted as CYL or C), and/or an axis (usually between 0 and 180). The input may include input for the left optical subsystem 130*l* and the right optical subsystem 130*r*.

Adjustment of the optical settings of the optical subsystem 112 may be adjusted in real-time through feedback provided by the user 104. The controller 702 may initiate a test to determine adjustments to make to the optical settings of the optical system 112. The test may involve causing the virtual image display unit(s) 106 to display particular visual content, such as a test pattern or a detailed visual image, and prompting the user to provide feedback via the input device(s) 710 or the control panel 604. The user 104 may provide feedback indicating that aspects (e.g., text, images) of the visual content appear unclear. The controller 702 may adjust the optical settings of the optical system 112 and ask the user 104 whether the adjustments improved clarity of the aspects of the visual content. This process may be iterated until the user 104 is satisfied with the clarity of the visual content. The test may be performed in response to receiving user input from a user 104 via an input device 710 or the control panel 604.

Input over the communication interface 708 may be provided by a device (e.g., laptop, desktop, mobile device, controller) as a result of user interaction. The computing device may include a set of instructions (e.g., application, program) that the user can interact with to cause the computing device to send communications including information indicating or representative of optical characteristics for modifying the virtual image light 102 to correct for the user's 104 vision conditions. The user may enter the input into the input device 710 or the computing device as a prescription provided by a medical professional and may have a predetermined format, as described above.

The controller 702 may, in response to receiving the input from the input device(s) 710 or the communication interface 708, determine signals to send to the actuators 720. One or more of the processors 704, for example, may access a data structure stored in the memory 706 indicating control signals to be sent to corresponding actuators 720. The data structure may be an array, lookup table, or other referential structure in which input data is associated with the corresponding output (i.e., control signal) to be sent to particular actuators 720. In some implementations, the controller 702 may store information in the memory 706 indicating a current state of the optical system 112 (e.g., current states of the actuators 720) from which the controller 702 may determine adjustments to the actuators 720 to be made to satisfy the input received.

In some embodiments, the HMD 100 may be configured to detect vision conditions of the user's eyes 105*l* and 105*r* and automatically adjust the optical system 112 as a result of the detection. In such embodiments, the HMD 100 may include one or more sensors 724 that detect information regarding the user's eyes 105*l* and 105*r* and provides measurements to the controller 702, which adjusts the optical system 112 accordingly. The HMD 100 may also include one or more lighting elements 726 coupled to the controller 726 for use in connection with the sensor(s) 724 for obtaining information. The light emitting element(s) 726 may emit light at an angle and having certain characteristics (e.g., frequency, intensity) such that the light is reflected and received by the sensor(s) 724. The sensor(s) 724 may determine, based on the light detected from the user's eye, information about the user's eyes. As a result of the information determined regarding the user's 104 eyes, the controller 702 may adjust the optical characteristics of the optical system 112 accordingly. Such information may include information indicating a topology of the cornea, which the controller 702 may process to determine control signals to be sent to the actuators 720 for adjusting the optical system 112 so that the user 104 can resolve the virtual image light 102 as clear visual content.

Figure 8:
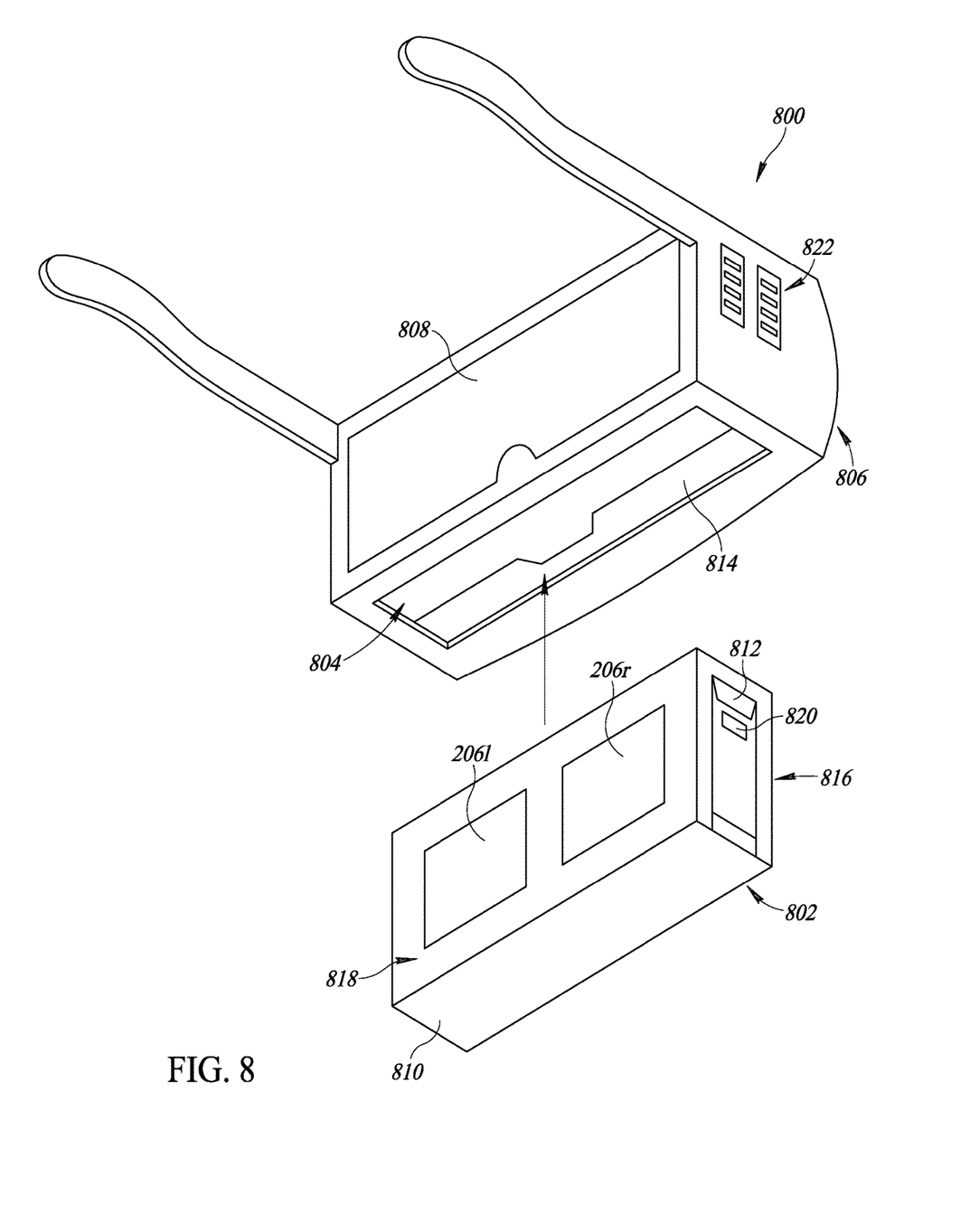
FIG. 8 shows a bottom perspective view of a head-mounted display having a selectively installable optical system according to one or more embodiments.

FIG. 8 shows an embodiment of an HMD 800 having an optical subsystem 802 that is selectively installable in and removable from the HMD 800. In particular, the HMD 800 has a cavity 804, provided between a front portion 806 and a viewing portion 808, sized and shaped to receive the optical subsystem 802. The optical system 802 has a body 810 sized and shaped to snuggly fit within the cavity 804. The optical system 802 contains the left and right optical subsystems 130*l* and 130*r* (FIG. 1) each comprising one or both of the first correction portion 210 and the second correction portion 212 described herein. The HMD 800 is configured to securely and selectively retain the optical system 802 upon insertion of the body 810 therein. The body 810 may, for instance, have a fastener or other feature 812 that engages with a corresponding feature within the cavity 804 to retain the optical subsystem 112 once inserted in the cavity 804. The HMD 800 may, in some implementations, have a set of doors 814 that open to allow insertion of the optical system 804, but which remain closed otherwise to prevent dust and debris from entering the HMD 800.

A front side 816 of the body 810 includes a receiving portion 202 for receiving virtual image light 102 from the virtual image display units 106, as described above. A back side 818 of the body 810 includes left and right emitting portions 206*l* and 206*r* for emitting the corrected virtual image light 114 for viewing by the user 104. The optical subsystem 812 may have one or more electrical contacts 820 exposed on an exterior surface sized and shaped to engage with corresponding electrical contacts within the cavity 804 for establishing an electrical connection through which signals and power may be transmitted to actuators of the optical system 802.

In some embodiments, the optical system 802 may include a controller independent of the controller 702 for sending control signals to the actuators 720. The independent controller of the optical system 802 may receive signals or information from the controller 702 or the communication interface 708 and adjust the optical characteristics of the left and right optical subsystems 130*l* and 130*r* according to the signals or information received. In some instances, the user 104 may interact with input devices 822 provided on an exterior of the HMD 800 to adjust the optical characteristics, as described above with respect to the control panel 604.

In some embodiments, the optical subsystem 812 may include a mechanical interface (e.g., dials, knobs) instead of or in addition to the electrical contacts 820 for selectively adjusting the optical settings of the left and right optical subsystems 130*l* and 130*r*. The mechanical interface may be operable by a user to adjust the optical settings. In some embodiments, the mechanical interface may interface with a corresponding mechanical interface within the cavity 804. The user may interact with the control panel 604 which may cause the corresponding mechanical interface within the cavity to interact with the mechanical interface of the optical system 802 to adjust the optical settings.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A head-mounted display device, comprising:
   a frame comprising a cavity;
   a virtual image display device coupled to the frame and configured to generate virtual image light for causing a user to perceive visual content; and
   an optical system that is selectively removably insertable into the cavity of the frame and, when the inserted into the cavity, the optical system is located along an optical path of rays of the virtual image light, the optical system comprising:
      a first correcting portion having a left optical subsystem and a right optical subsystem, each of the left and right optical subsystems of the first correcting portion including:
         one or more actuators; and
         a first set of lenses positioned at a first location along the optical path and having first optical characteristics correcting for a first set of vision conditions, at least one of a first lens and a second lens of the first set of lenses being selectively adjustable relative to the other of the first lens and the second lens of the first set of lenses, via the one or more actuators, along a first axis transverse to the optical path to modify the first optical characteristics; and
      one or more electrical contacts exposed on an exterior surface of the optical system, the one or more electrical contacts sized and shaped to engage with corresponding electrical contacts within the cavity of the frame to establish an electrical connection through which signals and power may be transmitted to the one or more actuators of the optical system.

2. The head-mounted display device of claim 1, wherein the first set of vision conditions includes at least one of myopia or hypermetropia.

3. The head-mounted display device of claim 1 wherein the one or more actuators are operatively coupled to at least one of the first and second lenses of the first set of lenses and configured to selectively adjust a relative position of the first lens relative to the second lens along the first axis.

4. The head-mounted display device of claim 1, wherein the first lens is selectively adjustable relative to the second lens along the first axis, and the second lens is selectively adjustable relative to the first lens along a second axis transverse to the optical path to modify the first optical characteristics.

5. The head-mounted display device of claim 1, wherein each of the left and right optical subsystems of the first correcting portion further include a second set of lenses positioned at a second location along the optical path and having second optical characteristics correcting for a second set of vision conditions, at least one of a first lens and a second lens of the second set of lenses being selectively rotatable relative to the other of the first lens and the second lens, via the one or more actuators, about a second axis transverse to the first axis to modify the second optical characteristics.

6. The head-mounted display device of claim 5, wherein the second set of vision conditions include astigmatism.

7. The head-mounted display device of claim 5 wherein the one or more actuators comprise:
   a first actuator operatively coupled to at least one of the first and second lenses of the first set of lenses and configured to selectively adjust a relative position of the at least one of the first lens and second lens of the first set of lenses relative to the other of the first lens and the second lens of the first set of lenses along the first axis; and
   a second actuator coupled to and configured to selectively adjust an angular position of the at least one of the first lens and the second lens of the second set of lenses relative to the other of the first lens and the second lens of the second set of lenses about the second axis.

8. The head-mounted display device of claim 7, further including:
   a communication interface configured to receive user input; and
   a controller electrically coupled to and configured to control the first actuator and the second actuator to respectively adjust the position of the at least one of the first and second lenses of the first set of lenses and the angular position of the at least one of the first lens and the second lens of the second set of lenses based on the user input.

9. The head-mounted display device of claim 8, wherein the user input specifies an optical prescription of the user.

10. The head-mounted display device of claim 8, further comprising:
    memory storing data storing a set of entries respectively indicating a state of at least one of the first actuator and of the second actuator, wherein the controller is further configured to, in response to receiving the user input, access an entry of the set of entries based on information specified in the user input, and control the first actuator or the second actuator according to the state indicated in the entry.

11. The head-mounted display device of claim 5, wherein the first lens of the second set of lenses is selectively rotatable relative to the second lens of the second set of lenses, and the second lens of the second set of lenses is selectively rotatable relative to the first lens of the second set of lenses.

12. The head-mounted display of claim 5, further including:
    a first user input device disposed on an exterior of the frame that is operable by a user to selectively adjust a position of the at least one of the first lens and the second lens of the first set of lenses along the first axis; and
    a second user input device disposed on the exterior of the frame that is operable by the user to selectively adjust an angular position of the at least one of the first lens and the second lens of the second set of lenses about the second axis.

13. The head-mounted display device of claim 1, wherein the optical system includes a controller operative to send control signals to the one or more actuators.

14. The head-mounted display device of claim 1, wherein the first set of lenses include one or more Alvarez lenses.

15. An optical system, comprising:
a frame sized and shaped for selectively removable installation in a cavity of a corresponding head-mounted display device, the frame including an attachment portion that selectively engages with a corresponding portion of the head-mounted display to install the frame in the head-mounted display;
an optical subsystem, carried by the frame, having a receiving portion that receives virtual image light when installed in the head-mounted display, an emitting portion that emits modified virtual image light from the optical system, and a vision correction portion located in an optical path of the virtual image light between the receiving portion and the emitting portion, the vision correction portion configured to modify the virtual image light to correct for a vision condition of a user and having a first correcting portion comprising a left optical subsystem and a right optical subsystem, each of the left and right optical subsystems including:
one or more actuators; and
a first set of lenses positioned at a first location along the optical path and having first optical characteristics correcting for a first set of vision conditions, at least one of a first lens and a second lens of the first set of lenses being selectively adjustable relative to the other of the first lens and the second lens of the first set of lenses, via the one or more actuators, along a first axis transverse to the optical path to modify the first optical characteristics; and
one or more electrical contacts exposed on an exterior surface of the frame, the one or more electrical contacts sized and shaped to engage with corresponding electrical contacts within the cavity of the corresponding head-mounted display device to establish an electrical connection through which signals and power may be transmitted to the one or more actuators of the optical subsystem.

16. The optical system of claim 15, wherein the first set of vision conditions includes at least one of myopia or hypermetropia.

17. The optical system of claim 15, further comprising:
a controller configured to selectively adjust a position of the at least one of the first lens and the second lens of the first set of lenses along the first axis to modify the first optical characteristics.

18. The optical system of claim 17, wherein the controller is configured to, in response to receiving a user input, selectively adjust the position of the at least one of the first lens and the second lens of the first set of lenses along the first axis.

19. The optical system of claim 18, further comprising:
an input interface provided on an exterior of the frame, configured to engage with a corresponding interface of the head-mounted display for receiving an input signal corresponding to a user input, the input interface electrically coupled to the controller, wherein the controller is configured to selectively adjust the position of the at least one of first lens and the second lens of the first set of lenses based on the input signal received.

20. The optical system of claim 15, wherein each of the left and right optical subsystems further include:
a second set of lenses positioned at a second location along the optical path and having second optical characteristics correcting for a second set of vision conditions, at least one of a first lens and a second lens of the second set of lenses being selectively rotatable relative to the other of the first lens and the second lens of the second set of lenses about a second axis transverse to the first axis to modify the second optical characteristics.

21. The optical system of claim 15, further comprising:
a first user input device disposed on an exterior of the frame that is operable by a user to selectively adjust a position of the at least one of the first lens and the second lens of the first set of lenses along the first axis.

22. The optical system of claim 15, wherein at least one of the first lens and the second lens is an Alvarez lens.

\* \* \* \* \*